(12) United States Patent
Barajas et al.

(10) Patent No.: US 7,324,924 B2
(45) Date of Patent: Jan. 29, 2008

(54) CURVE FITTING FOR SIGNAL ESTIMATION, PREDICTION, AND PARAMETRIZATION

(75) Inventors: Leandro G. Barajas, Troy, MI (US); Guoxian Xiao, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/341,782

(22) Filed: Jan. 27, 2006

(65) Prior Publication Data

US 2007/0179753 A1    Aug. 2, 2007

(51) Int. Cl.
G06F 19/00 (2006.01)
G06F 17/40 (2006.01)
G06F 7/00 (2006.01)
G06F 17/10 (2006.01)
G06F 17/12 (2006.01)
G06F 17/17 (2006.01)

(52) U.S. Cl. .................... 702/189; 73/866.3; 340/500; 340/540; 340/679; 340/691.1; 340/691.6; 702/127; 702/179; 702/182; 702/183; 702/184; 715/500; 715/502; 715/512

(58) Field of Classification Search ............... 73/866.3; 324/500, 511; 340/500, 540, 679, 680, 691.1, 340/691.6; 702/127, 179, 180, 182, 183, 702/184, 185, 189; 715/500, 502, 512; 708/200, 708/208, 290
See application file for complete search history.

(56) References Cited

U.S. PATENT DOCUMENTS

| | | | | |
|---|---|---|---|---|
| 2,985,499 A * | 5/1961 | Riblet | .................. | 346/107.3 |
| 3,151,312 A * | 9/1964 | Beck | .......................... | 708/813 |
| 3,946,212 A * | 3/1976 | Nakao et al. | .................. | 702/84 |
| 4,475,038 A * | 10/1984 | Lochmann et al. | ...... | 250/269.6 |
| 4,584,654 A * | 4/1986 | Crane | .......................... | 702/44 |
| 4,873,623 A * | 10/1989 | Lane et al. | .................. | 700/83 |
| 4,967,381 A * | 10/1990 | Lane et al. | .................. | 702/81 |
| 5,226,118 A * | 7/1993 | Baker et al. | ................. | 715/833 |
| 5,581,678 A * | 12/1996 | Kahn | .......................... | 345/440 |
| 5,793,380 A * | 8/1998 | Matsuno | ..................... | 345/443 |
| 5,808,903 A * | 9/1998 | Schiltz et al. | ................. | 702/56 |
| 6,411,921 B1 * | 6/2002 | Schiltz et al. | ............... | 702/182 |
| 7,079,984 B2 * | 7/2006 | Eryurek et al. | ............. | 702/185 |
| 2002/0188411 A1 * | 12/2002 | Schiltz et al. | ................. | 702/56 |
| 2003/0009399 A1 * | 1/2003 | Boerner | ....................... | 705/35 |
| 2005/0197803 A1 * | 9/2005 | Eryurek et al. | ............. | 702/185 |
| 2005/0197805 A1 * | 9/2005 | Eryurek et al. | ............. | 702/188 |
| 2005/0197806 A1 * | 9/2005 | Eryurek et al. | ............. | 702/188 |

OTHER PUBLICATIONS http://www.mathworks.com/products/curvefitting (downloaded Oct. 16, 2005).
https://tagteamdbserver.mathworks.com/ttserverroot/Download/21740_Curve_Fitting_Datasheet.pdf.

* cited by examiner

Primary Examiner—Edward R Cosimano

(57) ABSTRACT

A method and system of automatically curve fit data series to generate data signal characterization and prediction is disclosed. The method includes receiving input data including a plurality of data series and set of input parameters. The method also includes preprocessing the data series to generate preprocessed data according to a plurality of input parameters. The method further includes performing sorting and prioritization of the data series and curve fitting by a plurality of models and search and optimization algorithms on the smoothed or raw data series according to a plurality of input parameters to generate text and graphic output, and storing text and graphic output. The system includes modules for carrying out steps of the method.

17 Claims, 11 Drawing Sheets

700

| Structure | Values |
|---|---|
| ⊟ operation | |
|   ⊟ Fit | |
|     ⊞ Options | |
|     ⊞ Selection | |
|     ⊞ SortWeights | |
|     ⊞ FitWeights | |
|     ⊞ Smooth | |
|   ⊟ Filenames | |
|     ⊞ Data | |
|     ⊞ Plots | |
|   ⊟ Faults | |
|     ⊟ Fault  —702 | |
|       ● Code —704 | $654-14 |
|       ● Rank —706 | 1 |
|       ● Count | 330 |
|       ⊞ Plots | |
|       ⊟ Fit | |
|         ⊞ Goodness | |
|         ⊞ Output | |
|         ⊞ Options | |
|         ⊞ Model | |
|         ⊞ Coeff | |
|       ⊟ Data | |
|         ⊟ Point | |
|           ● Value | 0 |
|           ● Smoothed | 0 |
|           ● CurveFit | 7.473 |
|           ● LCBound | 0 |
|           ● UCBound | 65.1276 |

*FIG. 7*

Data File: C:\Example data
Model: Weibull
Date: September 30, 2005
Report: Goodness of Fit metrics

| | |
|---|---|
| sse | 79.1513 |
| rsquare | 0.79834 |
| dfe | 6 |
| adjrsquare | 0.6795 |
| rmse | 3.6321 |
| rmseu | 2.8134 |
| sst | 392.4924 |
| ssr | 5784.7611 |
| mae | 2.0286 |
| rae | 0.10006 |
| rse | 0.013013 |

*FIG. 8*

| Structure | Values |
|---|---|
| Rank | 1 |
| Count | 330 |
| ⊞ Plots | |
| ⊟ Fit | |
| ⊟ Plot | |
| ⊟ curve | |
| x | [0;0.063;0.126;0.189;0.252;0.315;0.378;0.441;0.504;0.567;0.6 |
| y | [0;0.57447;1.1496;1.7253;2.3018;2.8788;3.4566;4.0351;4.6142 |
| attribu | r- |
| ⊟ points | |
| x | [0;7;14;21;28;35;42;49;56;63 |
| y | [-0.54222;0.2316;0.19112;1.0685;-0.87756;-0.70218;0.70906;-0 |
| attribu | b. |
| ⊟ bounds | |
| lower | [-44.747;-44.3952;-44.0457;-43.6983;-43.3531;-43.0101;-42.66 |
| upper | [62.9741;62.6425;62.3134;61.9868;61.6627;61.341;61;0218;60 |
| attribu | r: |
| ⊟ Goodness | |
| sse | 79.1513 |
| rsquare | 0.79834 |
| dfe | 6 |
| adjrsquare | 0.6975 |
| rmse | 3.6321 |
| rmseu | 2.8134 |
| sst | 392.4924 |
| ssr | 5784.7611 |
| mae | 2.0286 |
| rae | 0.10006 |
| rse | 0.013013 |
| ⊟ Output | |
| numobs | 10 |
| numparam | 4 |
| residuals | [-1.3121;0.6621;0.64545;4.2632;-4.1362;-3.9099;4.6642;-0.2196 |
| Jacobian | [0,0,0,0.14397;58.339,8.3341,1.1906,0.17008;551.3555,39.3825, |
| exitflag | 1 |
| algorithm | QR factorization and solve |

*FIG. 9*

CURVE FITTING FOR SIGNAL ESTIMATION, PREDICTION, AND PARAMETRIZATION

TECHNICAL FIELD

An analysis tool for use in manufacture is disclosed. More particularly, this disclosure relates to curve fitting to characterize data for trend prediction.

BACKGROUND

In large scale manufacturing and assembly plants, such as those used in automobile manufacturing, hundreds of machines and their machine operators may work simultaneously. In a large production environment, the production line may include miles of conveyors. The plant itself may be millions of square feet. An increase in the precision of production timing and/or control may provide better resource allocation. Accordingly, process and controls that keep the line moving may increase production and reduce expenses.

For example, machine stations at an automotive plant may process hundreds or even thousands of products. In large assembly or manufacturing plants, large numbers of machines may be grouped into several stations and at the same time stations may be grouped based on operations. Many plants are substantially automated and e-enabled, where machines on the production line may be equipped with programmable logic controllers (PLCs) to control machine operations, and to monitor machine state.

For many different reasons, a machine may malfunction or change state and generate a fault or event code. There may be thousands of fault codes associated to each machine. A fault code is an industry term to indicate a symptom and sometimes the cause of a problem with a machine. Much like in a modern automobile, digital and analog sensors are disposed in a machine to sense process variables and to detect when out of the ordinary situations occur. In the case of an automobile, for example, if a door is left ajar, a fault or event code will be generated to alert the occupant that a door is ajar. Fault or event codes, when generated, may be electronically sent to a central location or to a large electronic marquee board on the plant floor when a machine stops operating.

In general the machines do not generate fault codes but event codes. Most event codes do not reflect any abnormal behavior of the machine. They merely inform about the status of the machine. For example, if a machine does not receive a part in n seconds then it generates an event code to indicate that a time-out has occurred and that it may require human intervention. A fault code or event code does not necessarily mean that the machine is down. Actually many event codes are generated while the machine still runs, e.g., a machine may generate an event code saying that 10,000 cycles have passed since a tool change was done and that likely it will need a new tool soon. However such an event code may not stop operations.

In a large plant, when one machine fails, its entire station or zone may stop operating, and thus the impact of the failure may be high. Parts to be processed by the machine or station may accumulate, with machines that are feeding the halted machine becoming blocked because the buffer upstream of the halted machine has filled. Moreover, parts discharged for further processing by a downstream machine may drain from the buffer downstream of the halted machine, with machines that are drawing from that buffer becoming starved. The impact of a downed machine or station can quickly spread to other machines and stations of the production line.

The maintenance staff is best utilized carrying out its primary task of maintaining the machines with preventive or predictive maintenance. Maintenance staff's primary task also includes repairing significant equipment failures. While routine maintenance may be planned, faults are not predicted in a dynamic way. Thus, maintenance and repair resources may at times be overwhelmed in the number of fault codes received from the line.

Various applications to process data are used in the manufacturing management process. They include those to monitor fault codes as they occur. More comprehensive analysis is possible however, it is extremely time consuming and often impractical due to the volume of the data that is required to be processed.

The processing of data by the various applications, however, may typically not include processing real-time data with historical data to get up to the minute predictions on future fault code generation. In this way, current conditions may typically not be correlated with historical conditions to provide up-to-date predictions.

SUMMARY

Disclosed herein are a method, system and apparatus for curve fitting and data trending and prioritization to generate signal characterization and predictions. Input data received in a preprocessing step include a plurality of data series and a set of input parameters. The data series may include both historical data and recently and/or currently generated data. The input parameters are manually or automatically provided. Preprocessing includes weighting, sorting, prioritizing, selecting, and smoothing the data series. Performing curve fitting by a plurality of curve fitting algorithms on the smoothed or unaltered data series can generate output in the form of text, graphics, work orders, and reports including predictions.

BRIEF DESCRIPTION OF THE DRAWINGS

FIG. 7 shows an example XML output file as seen using an XML file viewer;

FIG. 8 shows an example report including goodness of fit information;

FIG. 9 shows a different portion of an output file, as seen with an XML file viewer;

DETAILED DESCRIPTION OF THE INVENTION

Described herein are a method, system and apparatus for processing signals. Signals are preprocessed and then smoothed if necessary, after which they may be fit to a plurality of models. The user interface provides manual control over parameters, input, and output if the user desires to deviate from the automated processing options. The data signals may represent fault codes or event codes of a particular machine, station, a line segment, or other parts or the whole plant. Herein, the terms event codes and fault codes may be used interchangeably, as well as other names for sensed or observed operational statuses. The curve fits are analyzed by fitting and extracting parameters from the preprocessed and/or smoothed data, or even from probability functions for the fitting and extracting parameters, allowing system characterization and therefore, predictions. In manufacturing lines, for example, predicting the estimated downtime and the probable number of fault occurrences for the events with the highest negative impact on production line throughput may help to better utilize maintenance allocation resources.

This invention may be embodied in the form of any number of computer-implemented processes, operations, and apparatuses for practicing those processes. Embodiments of the invention may be in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 1:
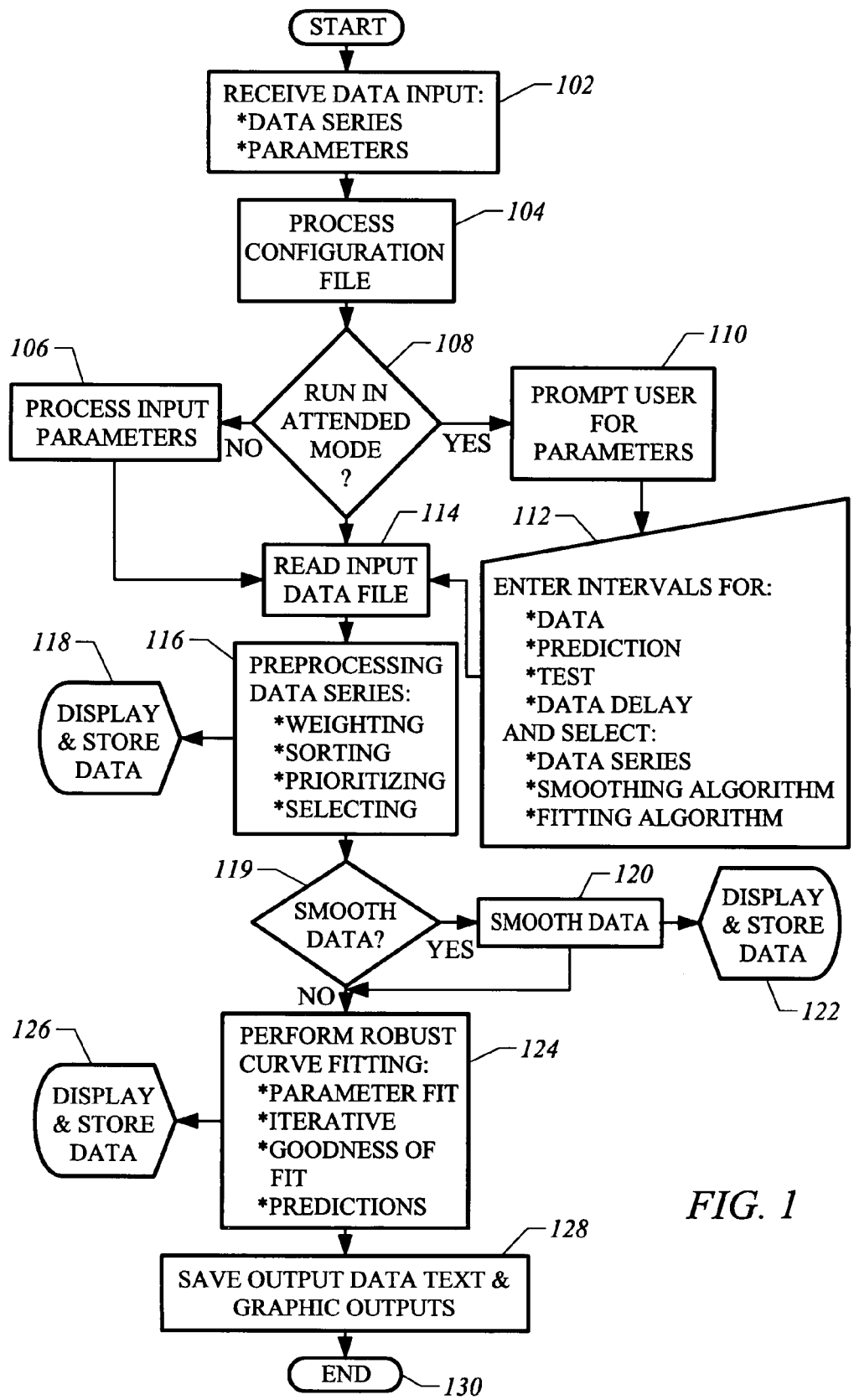
FIG. 1 is a flow chart of an embodiment of the process described herein including preprocessing the data and then performing the curve fitting for analysis and predictions.

FIG. 1 is a flow chart of a curve fitting process including preprocessing the data and then performing the curve fitting for analysis and predictions. The automated process as described herein may enable plant floor engineers to use sophisticated mathematical analysis algorithms to analyze data signals generated from machine fault codes.

As collected, fault signals form time series. The described estimation tool for fault prediction based on curve-fitting techniques enables end users to extract trend information from the time series. An end user may also be described herein as a user.

Historical or raw production fault data or any other source of data, for example, external and distributed databases, can potentially expose the underlying process trends by forecasting expected signal values. Such databases can be stored at different levels throughout the IT infrastructure of the production environment. For example, the last ten faults can be stored in the PLC internal memory, and the last few minutes or hours of the historical data may be stored temporarily in computer memory before being preprocessed and then stored for later use in a local or remote database repository.

Figure 2:
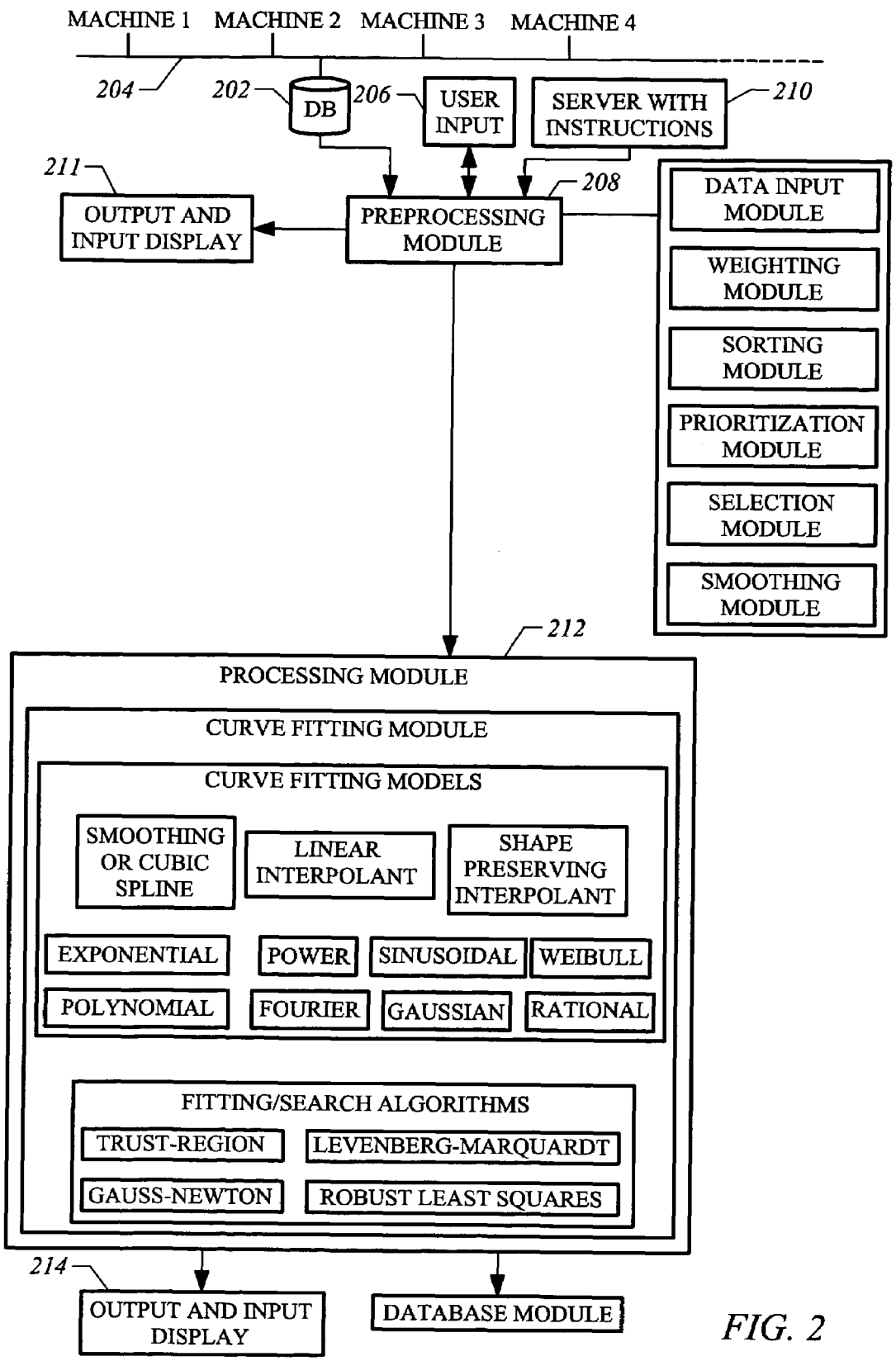
FIG. 2 depicts an embodiment of a system and apparatus including modules and units for preprocessing, curve fitting model selection, and optimization/search algorithms.

FIG. 2 depicts an embodiment of a system and apparatus including modules and units for preprocessing and curve fitting the data. FIG. 1 and FIG. 2 are discussed together. At the start, the data input including a plurality of data series is received 102 from a database or data store 202. As mentioned above, the data is fault code or event code data or other data in the form of data series. Other types of data that can be used as input include but are not limited to production, quality, reliability, and maintenance data. While this discussion refers to production systems, it will be understood that data series of any type of system including for example stock prices, or any kind of performance indicators, may be utilized for signal characterization and prediction in the technology described herein.

Fault code or event code data is collected from machines in a plant via a wired or wireless network as machines malfunction or otherwise change state. FIG. 2 shows Machines 1 to 4 on a line in communication with database 202 via network 204. A configuration file is processed at 104 to provide for configuring the data input and other processing options and parameters, as discussed in detail below. The configuration file may be for example an XML file. The configuration input may include input and output filenames, default processing parameters, selection between automated (batch) or user interactive mode, amount of data to be used, size of the intervals to be analyzed, starting and ending time, type of confidence bounds to be used (simultaneous or non-simultaneous, and by observation or functional), significance level, top N faults or top x percentage of faults to consider, prediction horizon, specific faults or zones to process, smoothing algorithm and factors, random search initial value, weighting scheme and coefficients, fitting scheme and weights, test interval, data delay, date/time format, input data file format type and specifications, other text or graphic output files or any other parameters as may be useful. Many of these configuration input parameters are discussed in more detail below in connection with FIG. 6.

A sensor in a machine may detect a condition or particular state or occurrence in the machine. The sensor communicates data to the machine's controller (PLC), which then may pass the information as raw binary data to a database. That is to say, for a particular event, the database may include a time-stamped entry or record whenever the event code is passed to the database due to a change of state corresponding to such code.

The same fault code or event code may have a variable within a fault code or event code description in the database record so that, every time that same fault is generated a slightly different fault message may be provided by the PLC, for example, the number of counts of that specific fault since the last reset, or the pallet number in which the part was placed when the fault was generated. Punctuation in the text message may provide structure in the record entered in the database. The database record may also include text describing possible resolution of the event. The record may further include a hierarchical fault description, for example, a main fault description, as well as a more specific, and/or more descriptive fault description. The record may include, in addition to fields for fault code and fault code type, fields for a fault code group, for the machine, the machine's station, zone, line, and plant. Fields such as these and others may also be used for grouping the data for processing.

Figure 3:
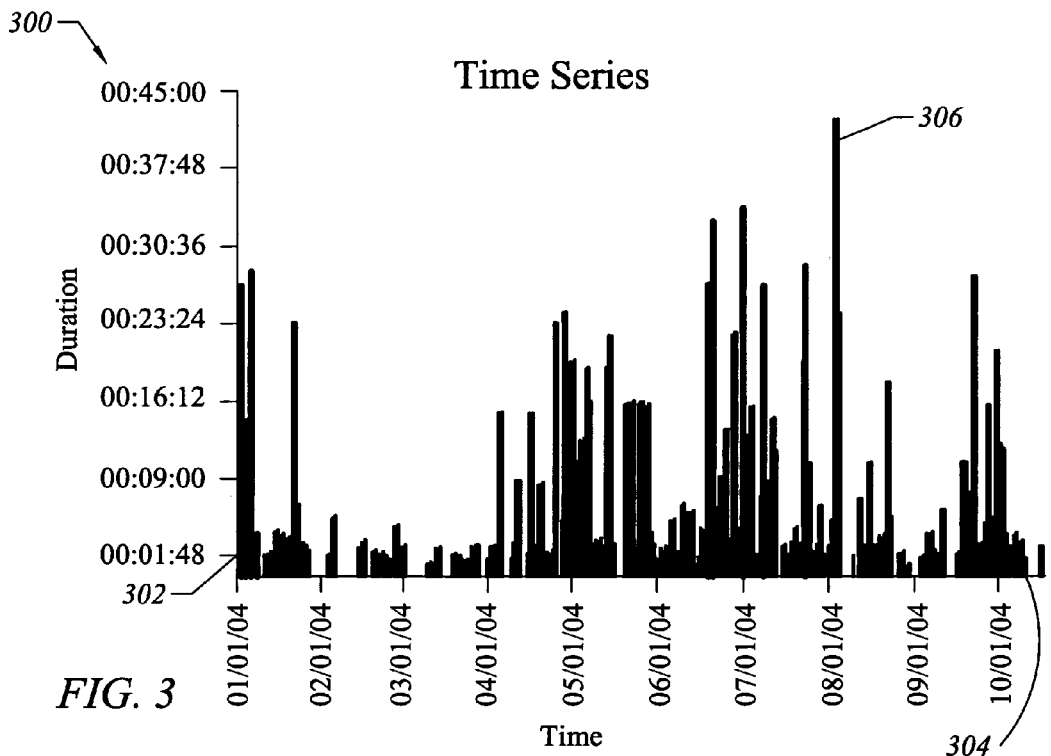
FIG. 3 shows an example of binary data as may be provided by a sensor, variable or event in combination with a machine controller.

FIG. 3 shows an example of binary data as may be provided by a sensor or PLC. In FIG. 3, data for a ten-month period is displayed 300. This may be considered raw data, but plotted in a particular way, for clarity. The binary data is displayed as duration on the vertical axis 302 vs. time of occurrence on the horizontal axis 304. Thus, the horizontal axis represents the start time of the event (activation of the binary variable corresponding to the error code or event code) and the vertical axis represents the duration of the event (how long the signal remains active). The duration plotted in FIG. 3 corresponds to the event duration, signifying continued occurrence of the event, as described above. While the horizontal axis spans ten months, the vertical axis spans 45 minutes. For example, the bar 306 may represent an event that occurred on Aug. 5, 2004 and lasted for about 44 minutes.

The binary data displayed in FIG. 3 may be converted to uniformly sampled data for the purpose of processing. A bin or sampling size may be selected according to the frequency of occurrence of a particular event code, or its mean time to repair or total downtime corresponding to that event code during a specified period of time. For example, a bin size of 10 minutes, 1 hour, several hours, days, or even weeks may be chosen. Choosing a bin or sampling size (in either a supervised or an unsupervised manner) facilitates conversion from non-uniform/event driven codes to uniformly sampled data, and facilitates feature extraction.

In one embodiment, frequency of occurrence may be extracted from the uniformly sampled data by counting how many times the event begins within a time interval (that is, within a bin). In another embodiment, event duration may be extracted by summing the durations of occurrences of events beginning within the time interval. "Ends" and "ending" may be just as well be used instead of "begins" and "beginning" above.

Other features that may be extracted from the binary data to form a database record include mean time to repair (MTTR), mean time between failures or events (MTBF), mean part count between failures or events (MCBF), downtime (DTM). For example, MTBF may be derived as the ratio of downtime to frequency. Adjusted versions of DTM, MTTR, MCBF, and MTBF can be extracted as well. Adjusted versions may omit events with few occurrences or zero (or nearly zero) downtime which may otherwise bias the statistic; also event spanning across non-production schedules or times like weekends may be adjusted to avoid undesirable effects due to outliers.

Statistics may also reflect feature extraction corresponding to combinations of event codes. For example, event code aggregation may entail grouping all events or faults which occur in the same machine, in the same station, or in the same zone. Additional ways to aggregate event data may include events of similar type, which may be treated as a single class of event. In a production facility, machines, stations, and/or zones may be arranged to form parallel production lines, or parallel sections of a production line. For parallel lines, and perhaps even for different production plants, it may provide meaningful statistics to aggregate such data to form a database record.

Figure 4:
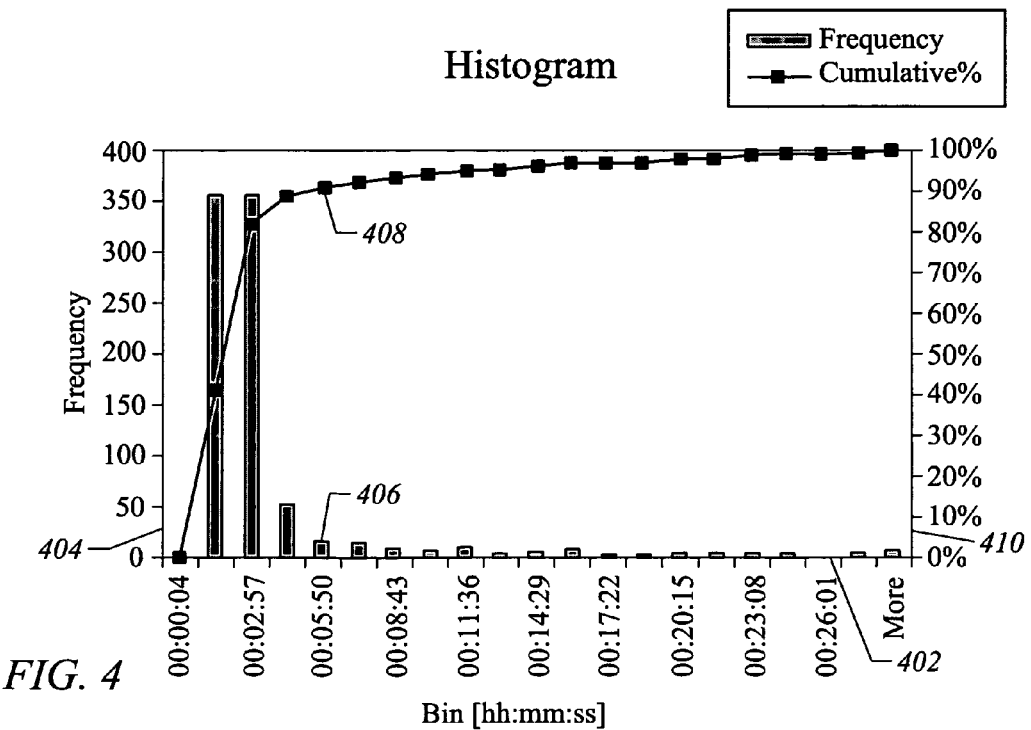
FIG. 4 shows a histogram including binned data corresponding to FIG. 3, as well as the empirical cumulative distribution function resulting from the same binned data.

FIG. 4 shows an example of binned data of a database record corresponding to the duration data of FIG. 3. The horizontal axis 402 represents the duration of an event. In FIG. 4, event durations are binned into bins of 86.5 seconds. The vertical axis on the left 404 represents frequency or counts. Thus, vertical bar 406 corresponds to about 10 events that had durations of around 5 minutes and 50 seconds. Also plotted in FIG. 4 is a cumulative distribution function (CDF) derived from the same binned data. For example, corresponding to vertical bar 406, data point 408 shows that the first five bins account for more than 90% of the cumulative data. The vertical axis on the right 410 represents cumulative percentage. As previously mentioned, FIG. 4 differs from FIG. 3 in that, for both plots in FIG. 4, the data from FIG. 3 is binned (counted) in time (duration) by frequency (counts). The CDF is thus an empirical CDF. Alternatively or in addition, an analytic form may be found by fitting an equation to the empirical data.

It will be appreciated that, for some data, downtime duration may not provide the best statistic for estimating repair time in a histogram similar to that of FIG. 4. For example, as shown in FIG. 4, most of the data occurs in the second and third bins, but the data as displayed in the histogram has a long right tail. There may be more suitable measures (i.e., with better suited statistical properties) than the sample mean and variance to estimate properties of the distribution, such as MTTR. Examination of the histogram, and its associated CDF, for example, may indicate that 85% of the repairs may be made in less than 3 minutes. Accordingly, the CDF and its parameters may thus be a useful feature to extract, along with MTTR, frequency, downtime, and the other features discussed above. Moreover, fitting an analytic form to the empirical data may provide for estimation of parameters characterizing the CDF or a related probability density function (PDF).

Returning now to discussion of FIGS. 1 and 2, after preparing the database record, the remainder of the process described herein may run in either attended (interactive) mode or unattended (batch) mode. If the query as to whether to run in attended or unattended mode 108 does not receive a timely answer (e.g., within 10 seconds), or receives a "NO" answer, the process runs without user intervention. In the unattended mode standard input parameters 106 from the configuration file may be provided for the preprocessing step to be read in a step 114. In the unattended stand-alone execution mode, the process may run for a predetermined period of time or until the process is completed.

Alternatively, if the answer is "YES" to the query to determine whether the process is in an unattended mode or an attended mode 108, then the user may provide input to the process during its execution. Thus, after a positive response to query 108, a prompt for user input can be made 110.

User input 206 allows the user, for example, during certain parts of the process, to instruct how much data to run depending upon which part of the process shown in FIG. 1 is running. For a single pass, there may be 1000 time series as input. In general, the process sorts according to importance. The preprocessing may select the top 50% of the total downtimes. In another example, the user may be interested in the top 5 from the 1000, or the top 30%. For sorting (which is discussed below), one can use weighting according to whether recent data is more important, or not. For example, weighting may be provided with an exponential forgetting factor, a linear forgetting factor, no forgetting factor (flat), or some other forgetting factor. In a similar manner, the data from the database record may also be chosen so as to not include outliers or stale historical data.

When the method and system are applied to give PDFs and CDFs, generally uniform weights are used for the chosen data. Use of weighting for the data, other than uniform weighting, to generate parameters for a probability distribution of parameters describing the data may bias the probability distribution derived from the data. When parameters are found for a PDF or CDF, generally there may be no trending associated with these parameters.

To further configure the data input, the user can also stipulate to a particular time period when data was collected, such as those faults generated week by week or in one month. In this way, a user can test the reliability of certain curve fitting processes by processing data to determine if an already realized fault event has occurred. Accordingly, trending over historical data may be set up by the user in any manner. During or before the preprocessing, an indication may be provided to the user via the user interface to show an amount of time required to run the process with varying amounts of historical data. Alternatively, raw data may be provided to the process directly without preprocessing, smoothing, weighting or sorting.

Returning to FIGS. 1 and 2, in attended mode, the input file including parameters and instructions 112 is delivered and read 114. Instructions are received by the preprocessing module 208 from server 210. The user may create, compare, and manage models and therefore the input by the user may include numerous parameters. Previewing, preprocessing by filtering including weighting, sorting, prioritizing, selecting and smoothing may all include parameters, settings and boundaries that the user may control.

In the preprocessing steps of the process, weighting, sorting and prioritization prepare the data for selection and smoothing. Weighting is discussed further below. The first step of prioritization is comparing across signals, possibly assigning different uniform weights across machines, as discussed further below. The algorithm may initially give for example, the top 5, or the top 70%. More generally, the algorithm may provide the top N faults, or the top x percent of faults. Trending (as shown in the data of FIG. 9, and discussed below in connection with the data of FIG. 9) may also be considered in prioritization. Since the data can be characterized according to any number of parameters, for example, downtime, frequency, or mean time to repair, among others, there may be different ways to sort the data. A choice of one of those parameters yields a particular ordering and thus a specific priority Some parameters may provide better characterization of interesting features of the data for sorting and ordering than others, depending on the data being sorted. Sorting by MTTR works better than sorting by frequency or counts, which works better than sorting according to downtime or duration. Once sorted data is obtained, the data may be prioritized according to importance. As will be discussed below in connection with FIG. 9, the priority may be given according to one parameter or feature of the data, for example, downtime, even if the data may be sorted according to another parameter or feature, for example, MTTR or a combination or fusion of several features.

Figures 5, 6:
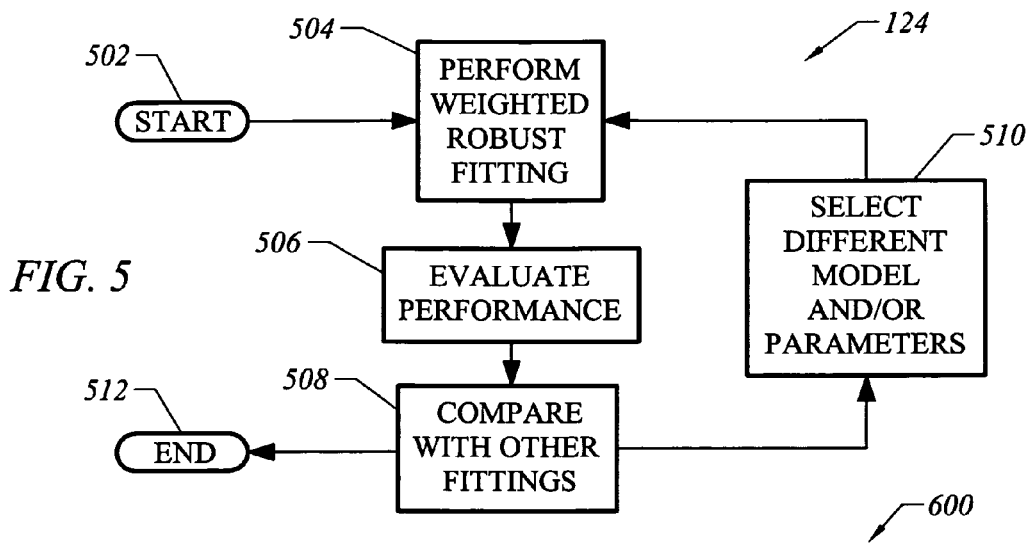
FIG. 5 is a flow chart of the interactive mode of the described process.
FIG. 6 shows an example XML input file or configuration file as seen using an XML file viewer.

Furthermore, before or after the preprocessing has taken place, additional evaluation by users 211 may be performed to determine optimal curve-fitting parameters depending on the nature of the signals. That is, the end user may run the automated process and review the output. If the output does not conform to end user standards, then the user may adjust the input parameters and the curve-fitting models. The input parameters may be selected by the user by means of an XML configuration file. Output also may be provided in XML/plain-text interfaces as well as graphics. Friendlier input graphical user interfaces may be provided with, for example, drop down menus as shown in FIGS. 6 and 7 discussed below. In any event, any configurable parameter, boundary and output format may be provided to the user. Alternatively, a more automated approach may be used, depending upon the user's choice.

For preprocessing input for weighting or sorting, choices may include different time intervals for the data. Weighting functions may include, for example, smoothing filters such as "Moving average," "Lowess," "Loess," "Savitzky-Golay," "Robust Lowess," and "Robust Loess." Sorting weights, and also fitting weights, can be assigned to be constant, linear or exponential. Output of smoothing algorithms may be brought to the display device as well.

As discussed above, in FIG. 2, preprocessing module 208 includes weighting, sorting, prioritizing, and selecting data series 116 that data may be intelligently fed to a curve fitting routine. Output of preprocessed data may be displayed 118, 211. The user may decide to change the parameters at the user input module 206 before continuing with optional smoothing of the data 120. Smoothed data output again may be displayed 122, 214. Whether or not optional smoothing is chosen 119, curve-fitting process 124 is performed.

After the data is preprocessed, if curve fitting is performed interactively, or alternatively in the configuration input file if the curve fitting is performed automatically, the user may choose the plurality of curve fitting algorithms by which to process the data, and the form of the output. Depending upon the time resources to run the process, data may be received 202 that include substantial historical data as mentioned above.

Accordingly, the curve-fitting process 124 can be performed iteratively such that all available models and different input parameters are used such that the model with the better fit/performance is selected. Turning to FIG. 5, curve fitting 124 processes 502 the smoothed data and performs weighted robust curve fitting 504. By robust is understood that the curve-fitting is not sensitive to outliers and this may be achieved for example by using modified non-linear least squares algorithms.

Weights may be provided for the data in at least two dimensions, for example weights to be applied for sorting the data, and weights to be applied for fitting the data to a curve. In weighted sorting, as discussed above, data in a data series may be weighted according to whether recent data is more important or not. In one case, for example, weighting may be provided with an exponential forgetting factor. In another case, for example, for data showing effects of acceleration, weighting with a linear forgetting factor may be provided. In still other cases, flat weighting, i.e., weighting having no forgetting factor may be provided. In yet other cases, weighting with some other forgetting factor may be provided.

For curve fitting, weighting may be performed across the time series, e.g., with exponential curve fitting to give more weight to more recent data. For example, considerations may include recently fixed fault vs. newer, growing fault (with exponential weighting for data). In this case, the weighting describes the strength by which a point of the fitting curve is drawn toward one of the data points of the data series for which the fitting is done.

Moreover, preprocessed data may also be weighted across signals. All the curves may be considered for curve fitting, with different weights for different curves. When all the curves represent fault or event code data in the same machine, all the curves may be given the same weight. Typically, though, the weighting may be carried out across machines. In that case, data may be weighted according to machine cycle time. In another case, the data may be weighted to account for structure of the production line. For example, if the production line is split into parallel lines, data from machines on each parallel line may be accorded weights of one half, with respect to data from machines on the production line upstream of the split. There may be other reasons as well for assigning different uniform weights across machines.

After the processing, an opportunity to evaluate the curve fitting process output 506 may be provided. This provision may be either automatic or manual. Further evaluation by comparing results with other fittings 508 may be provided by an output display viewed by the user. The user may then select one or more different models and/or parameters 510. The iterative process may be repeated until the process ends 512.

FIG. 6 shows an example XML input file or configuration file as seen using an XML file viewer 600. Configuration input parameters may include one or more input filenames 602. A user may in addition choose to use default processing parameters 604 or instead choose to enter values for individual processing parameters. The processing may run in unattended mode or user interactive mode. The user's choice is shown as 1, denoting unattended (batch) mode 606.

In the configuration input file, as shown in the XML viewer, a user may choose between a number of different types of confidence bounds to be used 608. For example, simultaneous or non-simultaneous bounds may be selected, and the bounds may be chosen to be by observation or to be functional bounds. The choice of type of bounds may be denoted by an integer, for example, 0, 1, 2, or 3. The user may also make a choice of significance level, $\alpha$610, with the confidence level given by 1-$\alpha$. For example $\alpha$ with a value of 0.05 has an associated confidence level of 95%.

A user may also choose if the top N faults 612 or top x percent 614 of faults are to be considered. In addition, as shown in the user interface or XML viewer, the configuration input file provides for choice of smoothing algorithm 616. In the XML view of the file, the choice is shown as an integer, denoting a particular choice of smoothing algorithm. A sort weighting scheme can also be chosen, according to associated integer values 618.

Similarly, a fitting weighting may be chosen, shown in the XML view of the configuration input file at 620. In addition, as shown in the user interface or XML viewer, a test interval may be selected, and is shown at 622. The test interval is used to assess prediction quality. An example may be seen in FIG. 11. A choice of data delay in the configuration input file may be made and is shown at 624.

Curve fitting, prediction, and/or trend output may be provided in a form and quantity determined by the user. In fitting data to a model, for example, a polynomial, the output can indicate an evaluation of the goodness of the fit.

The output may also inform the user if there are insufficient degrees of freedom for the kind of curve requested with respect to a particular data series. For example, to fit a data series to an equal linear combination of five Gaussians, ten or more data points suffice. A data series with fewer than ten data points would have too few degrees of freedom for the requested fit or model, and the output may so inform the user when the size of the data series is too small.

Predictions may be provided using trends and including confidence intervals. Fitting and extracting parameters like mean, variances or exponential coefficients from probability density functions or cumulative distribution functions may allow more accurate system characterization. In this way, metrics of whether enough data was processed and the quality of the fit may be provided.

Returning to FIG. 1, the curve fitting is performed 124 using as many or as few curve fitting algorithms or functions as the user chooses. For example, there may be over 80 predefined models available for curve fitting. A user may also incorporate a custom model or algorithm to be processed with others or independently. Preprocessing and curve fitting may be performed in parallel or in series. In one embodiment, the time series are processed in parallel, and fitting the models is performed in series (e.g., fits are done consecutively as the process ranges through the desired models).

Some options available in one embodiment for signal/fault estimation are shown in FIG. 2 in the curve fitting module 212. They may include probability models as well as the curve-fitting with splines or interpolant models: Smoothing spline, Cubic spline, Linear interpolant, Shape-preserving interpolant, Nearest neighbor interpolant, Weibull, Exponential, Rational, Gaussian, Sinusoidal, Power, Polynomial, and Fourier models, each of which can be fitted by using search algorithms such as, for example, Robust Linear and Non-Linear Least Squares (bounded and unbounded) with Levenberg-Marquardt, Gauss-Newton, or Trust-Region fitting algorithms. Many types of probability functions may be used in fitting and extraction of parameters, only some of which are shown in 212. Others may include Beta, Binomial, Chi-Square, Non-central Chi-Square, Discrete Uniform, F, Non-central F, Gamma, Geometric, Hyper-geometric, Lognormal, Negative Binomial, Poisson, Rayleigh, Student's T, Non-central T, and Uniform (Continuous) probability functions.

Returning again to FIG. 1, after the curve fitting algorithms have processed the data, an output display may display data 126. The text and graphics are saved 128 so that output may be further manipulated if desired. The program may end 130.

FIG. 7 shows an example of XML output as seen using an XML file viewer 700. The code associated with the particular fault or event whose data is under consideration may be shown 702. In the example shown, fault code $654-14 is shown to be ranked first 704, indicating it has been given highest priority following the prioritization step during preprocessing 116 of FIG. 1. As shown 706, there are 330 of these fault events in the data.

Reports produced for output may include evaluation of goodness of fit, predictions and verification of the accuracy of the predictions. An example report including goodness of fit information is shown in FIG. 8. The report may include the name of one or more data files, the name of the model and/or fitting algorithm used, and the date. In FIG. 8, the values of goodness of fit metrics are reported, such as, for example, the sum of squares due to errors (sse), the square of the correlation coefficient (rsquare), and other metrics. A different portion of an output file, as seen with an XML file viewer, is shown in FIG. 9.

Additional data partitioning and screening can be provided. The user may set parameters for reports as well. Prediction or confidence bounds can be calculated for a single observation or for the complete set of points in the fitting function, and they may be simultaneous or non-simultaneous. For output, the user may include time intervals for prediction, test and data delay, that is, the number of samples by which the data can be shifted for analysis purposes. Predictions may be made based on signal interpolation or extrapolation, following fitting of one or more curves to the data.

Figure 10A:
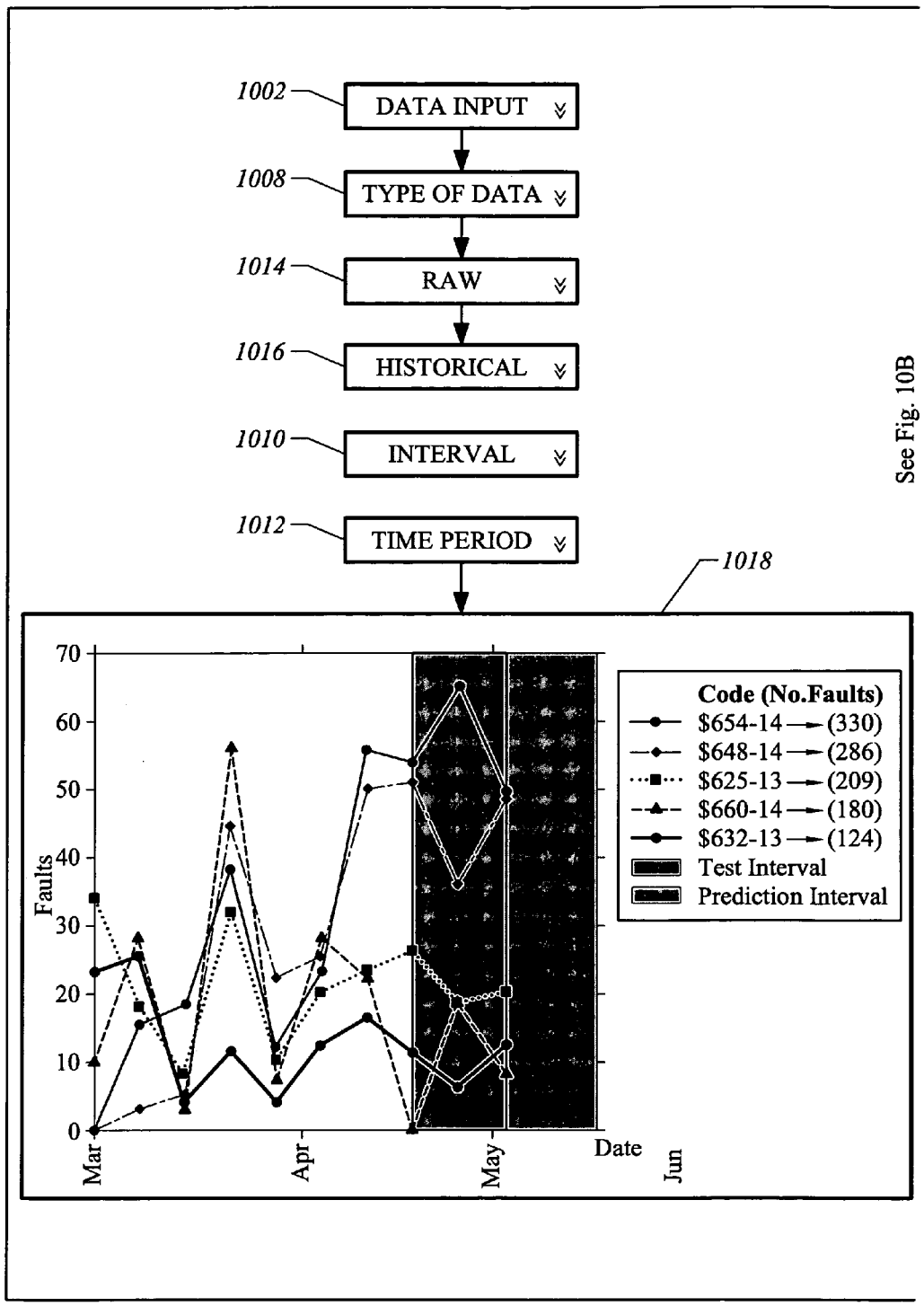
FIGS. 10A, 10B, and 10C depicts an embodiment of a user interface to configure the process as described herein.
Figure 10B:
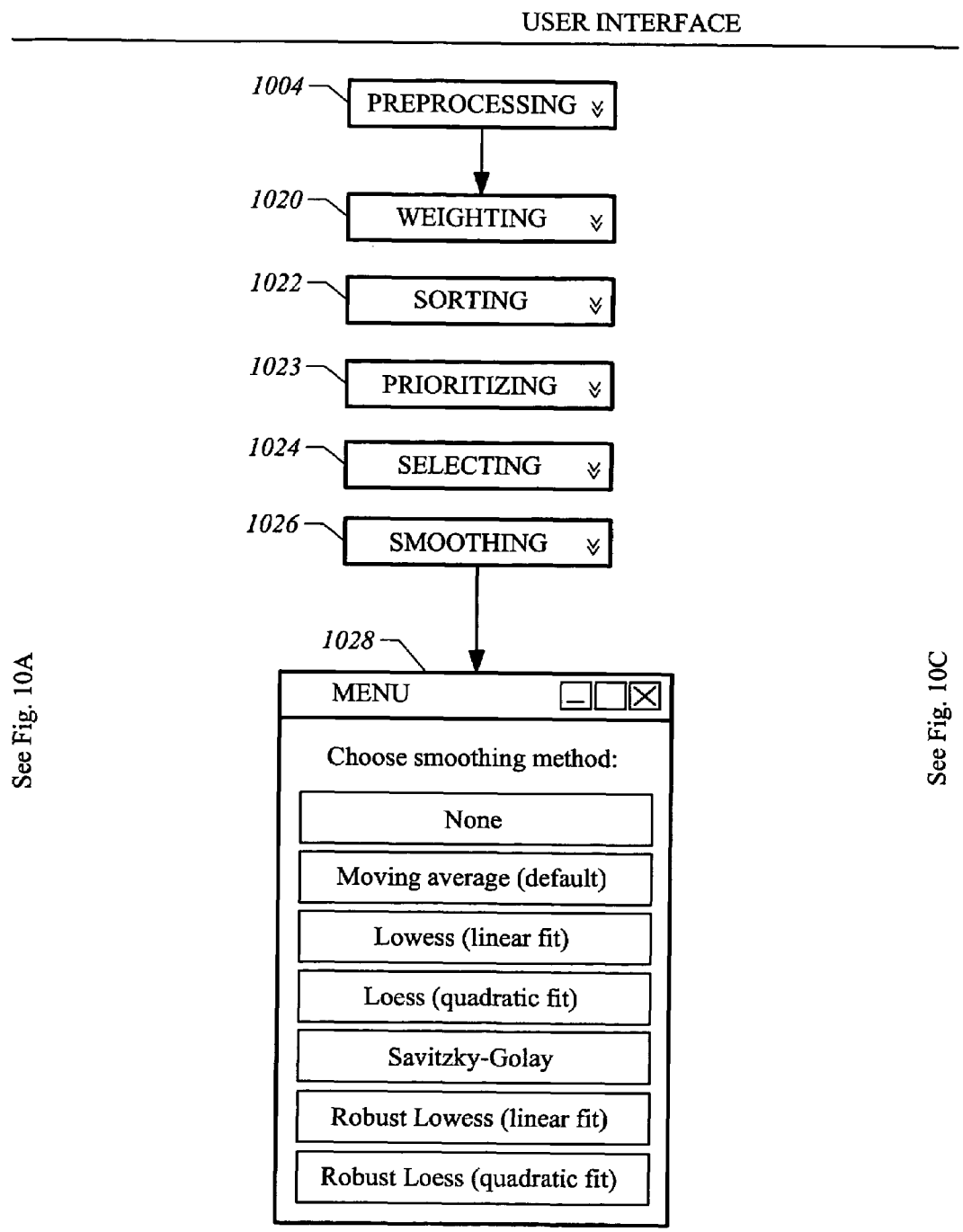
Figure 10C:
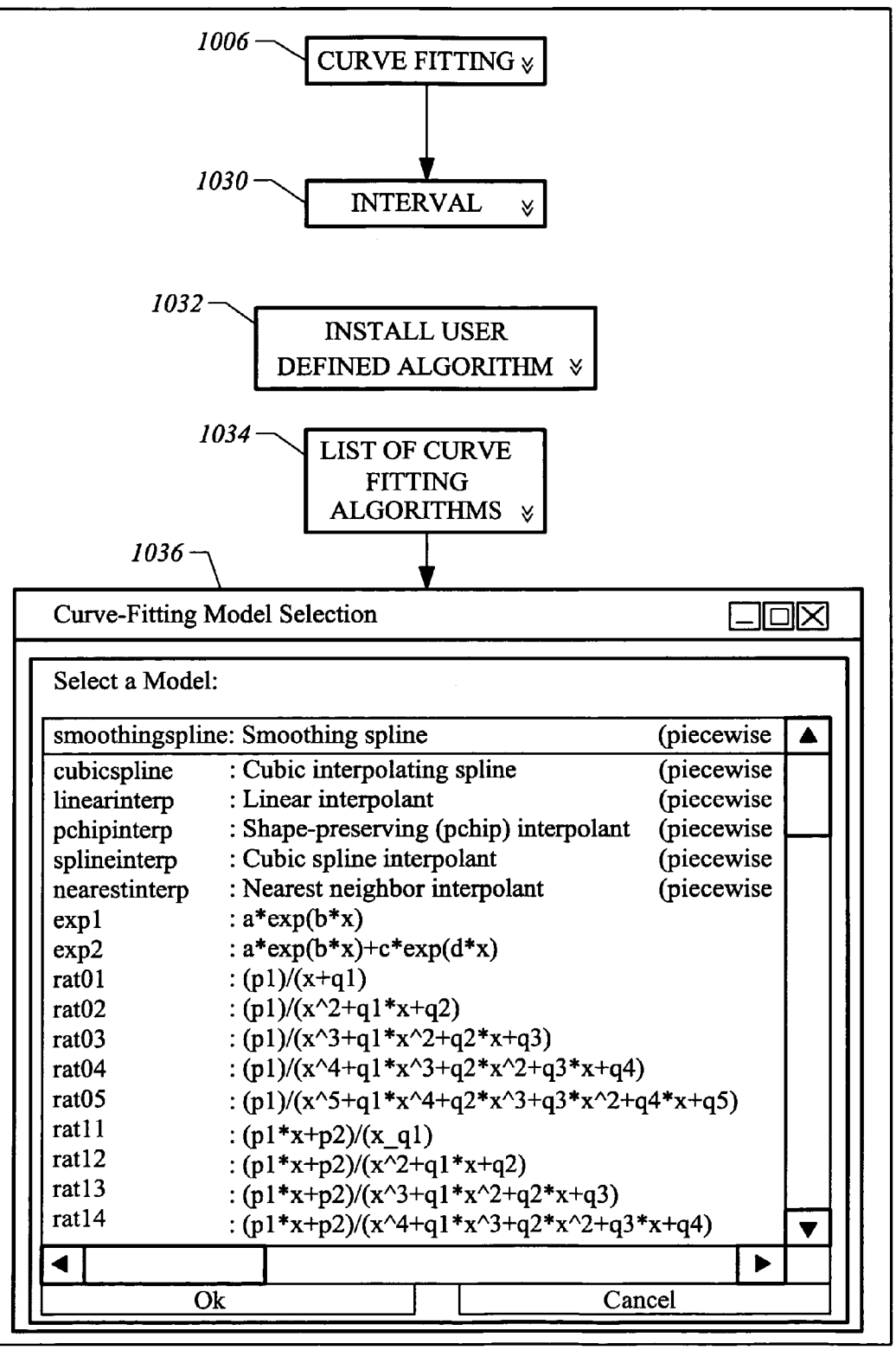

FIGS. 10A-10C depict an embodiment of a user interface of the data input steps 1002, the preprocessing steps 1004 and the curve fitting steps 1006. In the data input step, three larger categories, type of data 1008, the interval 1010 and the time period 1012 may be available for customization. Under type of data 1008, raw 1014 and historical 1016 may be available. Shown in FIG. 10A is a graph 1018 depicting input data signals over a two month period.

Preprocessing step 1004 in FIG. 10B may include user input menus for weighting 1020, sorting 1022, prioritiziirn 1023, selecting 1024, and smoothing 1026. Shown in FIG. 1013 is a drop down menu 1028 providing smoothing options. The curve fitting step 1006 in FIG. 10C may provide menu items for choosing intervals 1030, installing a user defined algorithm 1032 and a list of curve fitting modes 1034. Such a list may be represented to the user in a manner like that of chart 1036.

Figure 11:
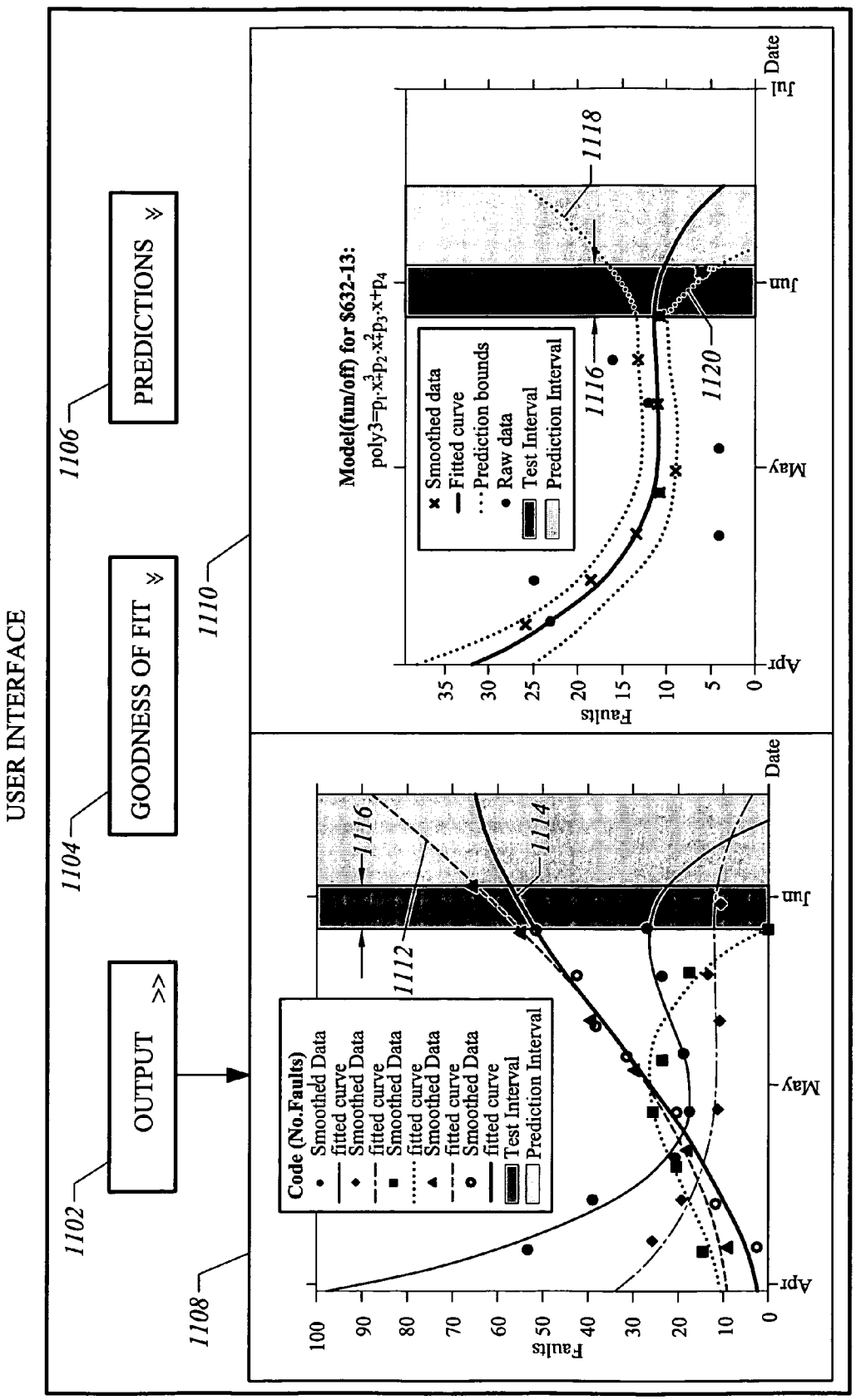
FIG. 11 depicts an embodiment of the user interface of the output.

As with many configurable aspects of the instant technology, the output may be configured by the user. FIG. 11 depicts an embodiment for the output configuration by the user. An output drop down menu 1102 may provide options for goodness of fit 1104 and prediction reports 1106. Outputs 1108 and 1110 are additional examples of output.

The plots on the lower left 1108 show data for the top five faults for a particular set of data. Also plotted are fits to each of the five subsets of data, one subset and fit for each of the top five faults. The top five faults for the example data shown in FIG. 11 are listed in the table below.

| Code | Number of Faults |
|---|---|
| $654-14 | 290 |
| $648-14 | 239 |
| $625-13 | 289 |
| $660-14 | 178 |
| $632-13 | 142 |

Although in many cases the faults may be sorted by counts, in this case it is more useful to sort and prioritize the faults based on the trend to the data. For example, fault $648-14 has 239 counts while fault $625-13 has 289 counts. Fault $648-14 has higher priority or higher rank than $625-13, even though fewer counts were collected, because the trend 1112 of fault $648-14 indicates it will be more important than $625-13 1114. Trending may also be applied to other features of the data. Thus, although the data may be sorted based on counts or frequency, MTTR may be a more important consideration for production operations. Trending of the data may yield predictions for MTTR which may result in a higher priority being assigned to a fault than the fault would be given if prioritized based on counts of that fault or the trend of the counts of that fault. A test interval to assess prediction quality is shown 1116 in both plot 1108 and 1110. Upper 1118 and lower 1120 prediction bounds may also be plotted. The prediction bounds may be based on the value provided for a in the configuration input file (see FIG. 6).

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method of a computer implemented process for automatically curve fitting data series to generate data signal characterization, the computer including a processor and a memory, the method comprising:

receiving from a data base to store in the memory input data including a plurality of data series and a set of input parameters to be utilized in subsequent preprocessing and curve fitting processes, the plurality of data series including performance indicators including at least one of machine fault codes, machine downtimes and machine maintenance data and the set of input parameters configurable by a user;

preprocessing by the processor the data series to generate preprocessed data according to a subset of the set of input parameters, the preprocessing configured to prepare the data series for a subsequent curve fitting process, the preprocessing comprising:

sorting by the processor the plurality of data series according to an input parameter to generate an ordered series; and prioritizing by the processor the ordered data series according to an input parameter to generate an ordered and prioritized series;

performing curve fitting by the processor, the curve fitting by a plurality of curve fitting algorithms on the preprocessed data including the ordered and prioritized series according to a subset of the set of input parameters to generate text and graphic output to represent data signal characterizations including at least one of goodness of fit and prediction values, the text and graphic output configurable by the user; and storing in memory the text and graphic output for subsequent display of representations of at least one of goodness of fit to at least one curve of the plurality of curve fitting algorithms and prediction values for future performance indicators including at least one of machine fault codes, machine downtimes and machine maintenance data;

wherein the data series comprise fault code data signals generated by machines in a production facility and wherein the data signal characterizations including at least one of goodness of fit and prediction values are utilized to generate work orders.

2. The method as recited in claim 1 wherein preprocessing comprises weighting the plurality of data series according to an input parameter to generate preprocessed data that is an ordered, prioritized and weighted series and wherein performing curve fitting further comprises:

performing curve fitting by the processor, the curve fitting by a plurality of curve fitting algorithms on the preprocessed data including the ordered, prioritized and weighted senes.

3. The method of claim 1, wherein performing curve fitting comprises performing curve fitting iteratively.

4. The method of claim 1, wherein performing curve fitting comprises performing curve fitting interactively.

5. The method of claim 1, wherein the data series are time series and wherein performing curve fitting on the data series further comprises:

generating by the processor values for evaluation of the goodness of fit of the data series to a plurality of curves of the curve fitting algorithms, the values for evaluation of the goodness of fit being for subsequent display.

6. The method of claim 1, wherein the data series are time series including values associated with past time values, and wherein performing curve fitting on the data series further comprises:

generating by the processor prediction values to extract trend information from the data series for subsequent display.

7. The method as recited in claim 1 wherein preprocessing comprises selecting a data series from the plurality of data series to generate preprocessed data that is a weighted, ordered, prioritized and selected data series and wherein performing curve fitting further comprises:

performing curve fitting by the processor, the curve fitting by a plurality of curve fitting algorithms on the preprocessed data including the weighted, ordered, prioritized and selected data series.

8. The method as recited in claim 7 wherein preprocessing comprises smoothing the selected data series according to an input parameter to generate preprocessed data that is an ordered, prioritized, selected and smoothed data series and wherein performing curve fitting further comprises:

performing curve fitting by the processor, the curve fitting by a plurality of curve fitting algorithms on the preprocessed data including the ordered, prioritized, selected and smoothed data series.

9. A method of a computer implemented process for automatically curve fitting data series to generate data signal characterization, the computer including a processor and a memory, the method comprising:

preprocessing by the processor, the preprocessing configured to prepare the data series including performance indicators including at least one of machine fault codes, machine downtimes and machine maintenance data for a subsequent curve fitting process, the preprocessing comprising:

receiving from a data base to store in the memory input data including a plurality of data series and a set of input parameters to be utilized in subsequent weighting, sorting, prioritizing, selecting, smoothing and curve fitting processes, the plurality of data series including performance indicators and the set of input parameters configurable by a user;

weighting by the processor the plurality of data series according to an input parameter to generate a weighted data series;

sorting by the processor the weighted data series according to an input parameter to generate a sorted data series;

prioritizing by the processor the sorted data series according to an input parameter to generate a prioritized data series;

selecting by the processor a data series from the prioritized data series to generate a selected data series;

smoothing by the processor the selected data series according to an input parameter to generate a smoothed data series; and processing by the processor comprising:

performing curve fitting by a plurality of curve fitting algorithms on the smoothed data series according to a plurality of input parameters to generate text and graphic output to represent data signal characterizations including at least one of goodness of fit and predictions values, the text and graphic output configurable by the user; and storing in memory text and graphic output for subsequent display of representations of at least one of goodness of fit to at least one curve of the plurality of curve fitting algorithms and prediction values for future performance indicators including at least one of machine fault codes, machine downtimes and machine maintenance data;

wherein the data series comprise fault code data signals generated by machines in a production facility and wherein the data signal characterizations including at least one of goodness of fit and prediction values are utilized to generate work orders.

10. The method of claim 9, wherein the data series are time series and wherein performing curve fitting on the data series generates values for evaluation of the goodness of fit of the data series to a plurality of curves generated by performing curve fitting on the data series by the processor, the values for evaluation of goodness of fit being for subsequent display.

11. The method of claim 9, wherein the data series are time series including values associated with past time values, wherein performing curve fitting generates prediction values to extract trend information from the data series for subsequent display.

12. The method of claim 9, wherein performing curve fitting comprises performing curve fitting iteratively.

13. The method of claim 9, wherein performing curve fitting comprises performing curve fitting interactively.

14. A computer implemented system for curve fitting data series to generate data signal characterization, the computer including a processor, a memory and modules including instructions and configured to cooperate with the processor, the system comprising:

a preprocessing module configured to prepare the data series including performance indicators for a subsequent curve fitting process, the preprocessing module comprising;

a data input module for receiving input data from a data base to store in the memory, the input data including a plurality of data series and a set of input parameters to be utilized by weighting, sorting, prioritizing, selecting smoothing and curve fitting modules, the plurality of data series including performance indicators including at least one of machine fault codes, machine downtimes and machine maintenance data and the set of input parameters configurable by a user;

a weighting module for weighting the plurality of data series according to an input parameter to generate weighted data series;

a sorting module for sorting the weighted data series according to an input parmeter to generate sorted data series;

a prioritization module for prioritizing the sorted data series according to an input parameter to generate prioritized data series;

a selection module for selecting a data series from the prioritized data series to generate a selected data series;

a smoothing module for smoothing the selected data series according to an input parameter to generate a smoothed data series; and a processing module comprising:

a curve fitting module for performing curve fitting by a plurality of curve fitting models and curve fitting algorithms on the smoothed data series according to a plurality of input parameters to generate text and graphic output to represent data signal characterizations including at least one of goodness of fit to at least one curve of the plurality of curve fitting algorithms and prediction values for future performance indicators; and a database module for storing text and graphic output in the memory text and graphic output for subsequent display of representations of at least one of goodness of fit and prediction values including at least one of machine fault codes, machine downtimes and machine maintenance data, the text and graphic output configurable by the user;

wherein the data series comprise fault code data signals generated by machines in a production facility and wherein the data signal characterizations including at least one of goodness of fit and prediction values are utilized to generate work orders.

15. The system of claim 14, wherein the curve fitting module is adapted to perform curve fitting iteratively and interactively.

16. The system of claim 14, wherein the data series are time series including values associated with past time values, wherein the curve fitting module is adapted to generate prediction values to extract trend information from the data series for subsequent display.

17. The system of claim 14, wherein the data series are time series and wherein the curve fitting module is adapted to generate values for goodness of fit of the data series to a plurality of curves generated by performing curve fitting on the data series by the processor, the values for evaluation of the goodness of fit being for subsequent display.

* * * * *